(12) United States Patent
Messier et al.

(10) Patent No.: US 10,350,550 B2
(45) Date of Patent: Jul. 16, 2019

(54) FLUID TREATMENT ASSEMBLY AND METHOD OF USE

(71) Applicant: PALL CORPORATION, Port Washington, NY (US)

(72) Inventors: Sylvia Messier, Stow, MA (US); Thomas W. Leach, Holden, MA (US)

(73) Assignee: Pall Corporation, Port Washington, NY (US)

(*) Notice: Subject to any disclaimer, the term of this patent is extended or adjusted under 35 U.S.C. 154(b) by 0 days.

(21) Appl. No.: 15/654,204

(22) Filed: Jul. 19, 2017

(65) Prior Publication Data
US 2019/0022593 A1    Jan. 24, 2019

(51) Int. Cl.
*B01D 63/08* (2006.01)
*B01D 25/26* (2006.01)
*B01D 61/36* (2006.01)
*B01D 63/04* (2006.01)

(52) U.S. Cl.
CPC .......... *B01D 63/088* (2013.01); *B01D 25/26* (2013.01); *B01D 63/082* (2013.01); *B01D 63/084* (2013.01); *B01D 61/364* (2013.01); *B01D 63/046* (2013.01); *B01D 2313/02* (2013.01); *B01D 2313/06* (2013.01); *B01D 2313/21* (2013.01); *B01D 2315/10* (2013.01)

(58) Field of Classification Search
CPC ............... B01D 63/082; B01D 63/084; B01D 2313/02; B01D 2313/06; B01D 2313/025; B01D 2313/04; B01D 2313/105; B01D 2313/13; B01D 2313/21; B01D 25/26; F16B 39/12; F16B 39/24; H01M 8/248; H01M 10/0468; H01M 10/0481; Y10S 411/931
See application file for complete search history.

(56) References Cited

U.S. PATENT DOCUMENTS

| | | |
|---|---|---|
| 2,864,507 A | 12/1958 | Isreeli |
| 3,444,775 A * | 5/1969 | Hills ..................... F16B 31/021 411/3 |
| 4,715,955 A | 12/1987 | Friedman |
| 4,849,102 A | 7/1989 | Latour et al. |
| 5,154,560 A | 10/1992 | Copito |
| 5,314,279 A | 5/1994 | Ewing |
| 7,918,999 B2 | 4/2011 | Gagnon et al. |
| 8,232,022 B2 | 7/2012 | Erikstrup |

(Continued)

FOREIGN PATENT DOCUMENTS

| | | |
|---|---|---|
| EP | 2109912 A1 | 10/2009 |
| GB | 2 020 997 A | 11/1979 |

(Continued)

OTHER PUBLICATIONS

European Patent Office, Extended European Search Report in European Application No. 18183483.9, dated Dec. 19, 2018.

(Continued)

*Primary Examiner* — Pranav N Patel
(74) *Attorney, Agent, or Firm* — Leydig Voit & Mayer

(57) ABSTRACT

Fluid treatment assemblies comprising a plurality of adjustable tensioning rod assemblies comprising tensioning rods having a tensioning nut and a locking nut threadably attached to the tensioning rods, and methods of adjusting the tension on the assemblies, are provided.

19 Claims, 3 Drawing Sheets

(56) References Cited

U.S. PATENT DOCUMENTS

Figure 1C:
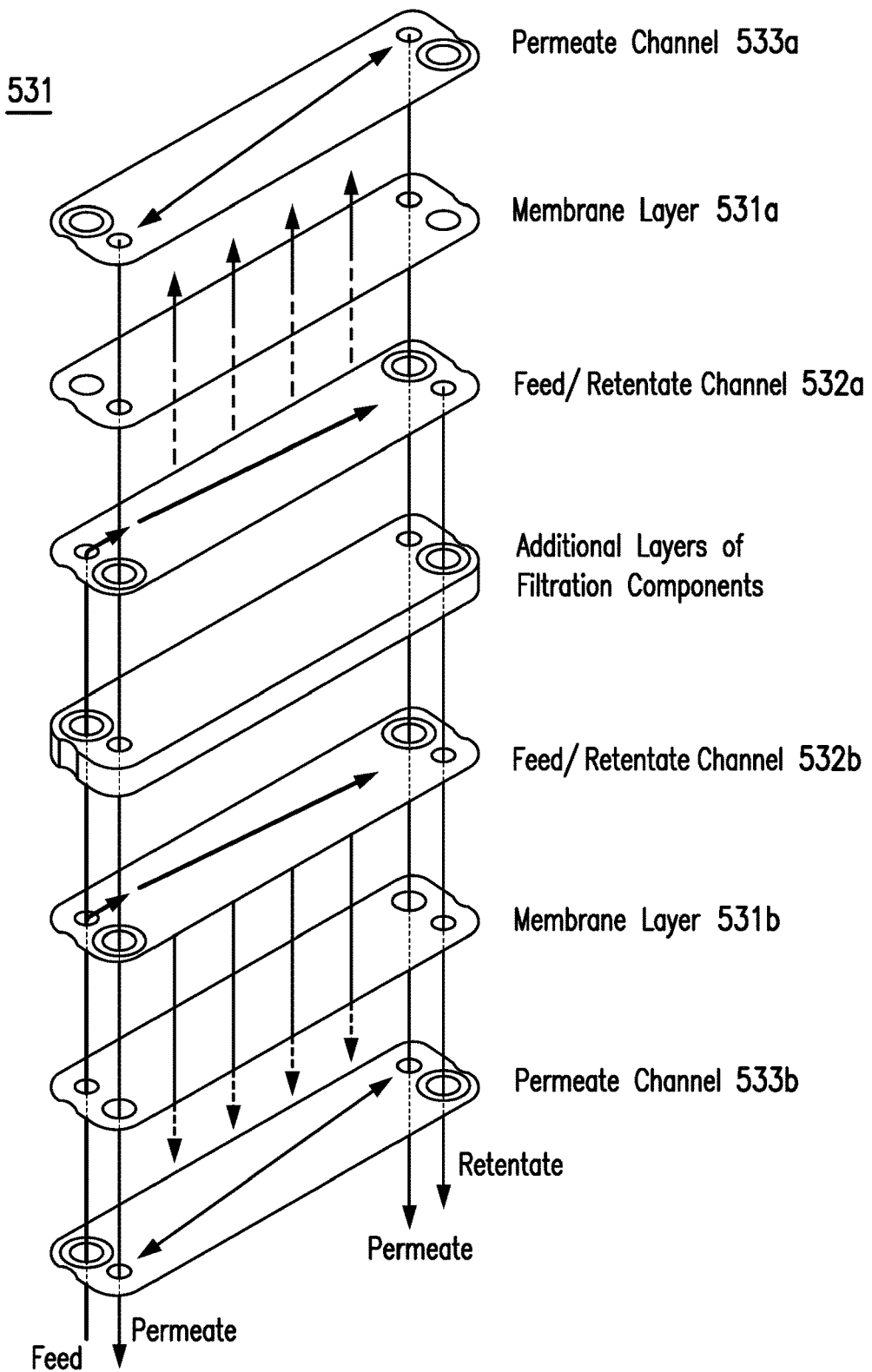

| | | |
|---|---|---|
| 8,728,682 B2 | 5/2014 | Kusakabe et al. |
| 8,980,088 B2 | 3/2015 | Forman et al. |
| 9,382,937 B2 | 7/2016 | Davies et al. |
| 9,620,809 B2 | 4/2017 | Turon Teixidor et al. |
| 2003/0152819 A1* | 8/2003 | Hatoh ............... H01M 8/0221 429/437 |
| 2005/0126981 A1* | 6/2005 | Connors, Jr. ....... B01D 63/081 210/321.76 |
| 2008/0135468 A1 | 6/2008 | Gagnon et al. |
| 2008/0135499 A1 | 6/2008 | Gagnon et al. |
| 2008/0145185 A1* | 6/2008 | Hocking ............... F16B 29/00 411/436 |
| 2008/0247840 A1* | 10/2008 | Davies .................. F16B 35/06 411/107 |
| 2013/0037486 A1 | 2/2013 | Sayer et al. |
| 2013/0064624 A1* | 3/2013 | Lee ....................... F16B 39/12 411/223 |
| 2013/0118971 A1 | 5/2013 | Sayer et al. |
| 2013/0221546 A1 | 8/2013 | Christ et al. |
| 2014/0042072 A1* | 2/2014 | Sayer .................. B01D 63/082 210/237 |
| 2014/0291242 A1 | 10/2014 | Notzke et al. |

FOREIGN PATENT DOCUMENTS

| | | |
|---|---|---|
| KR | 10-0522185 B1 | 10/2005 |
| WO | WO 2008/089977 A1 | 7/2008 |
| WO | WO 2016/076728 A1 | 5/2016 |

OTHER PUBLICATIONS

Singaporean Patent Office, Search Report in Singaporean Application No. 10201806032W, dated Mar. 14, 2019.

* cited by examiner

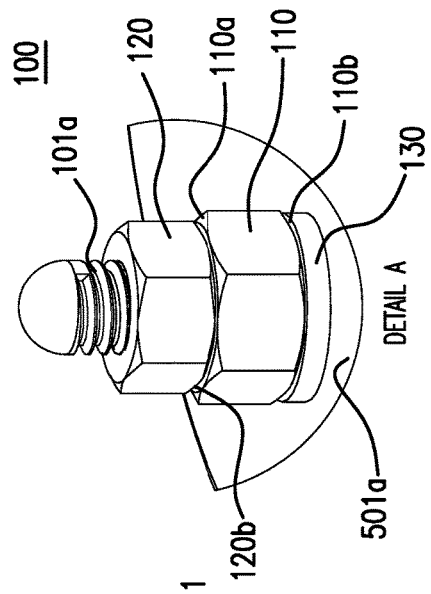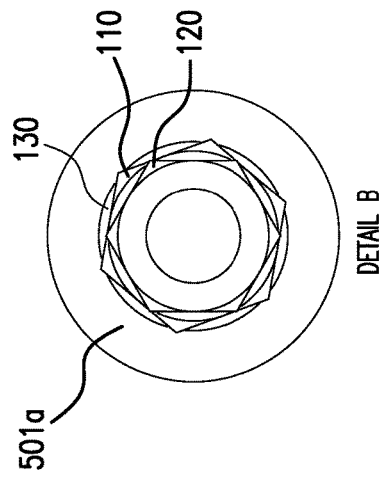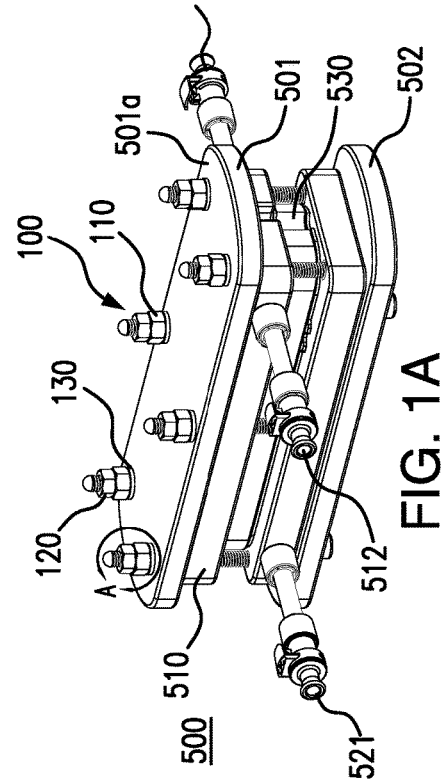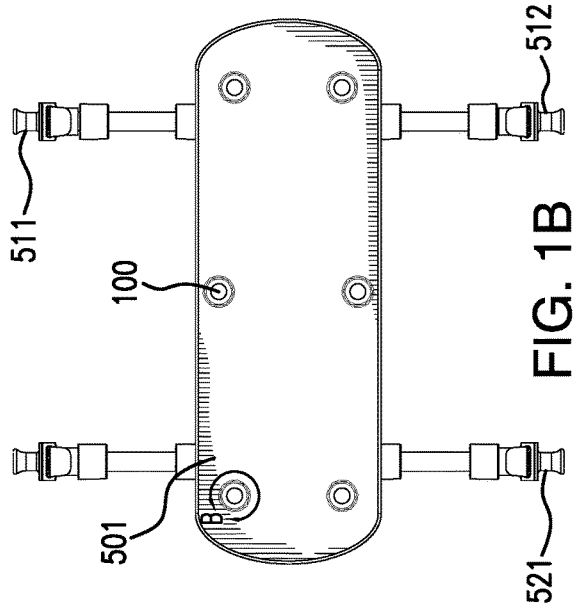

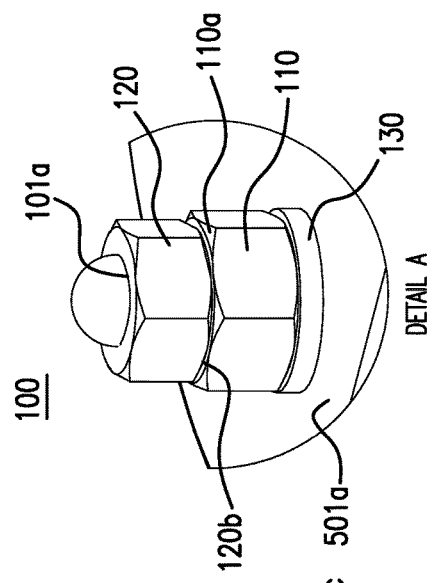
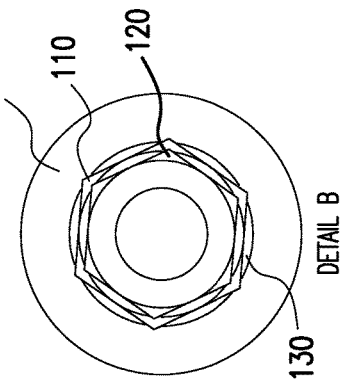
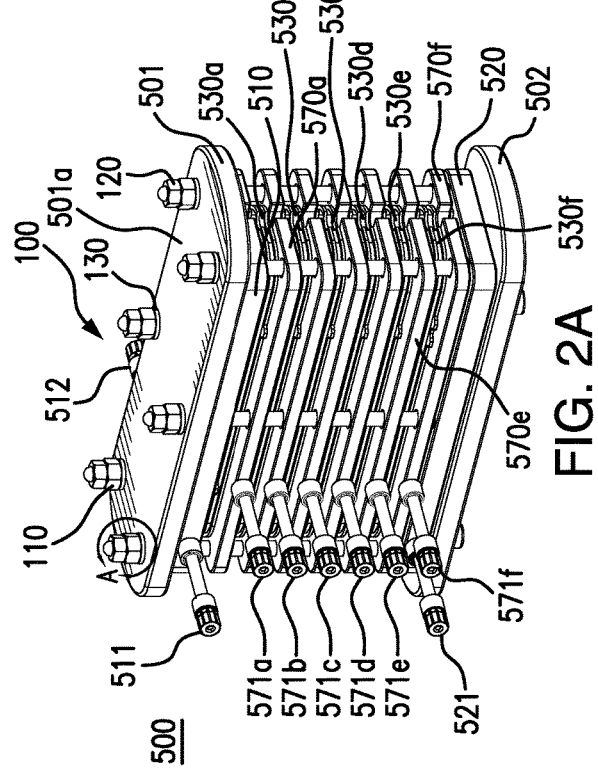
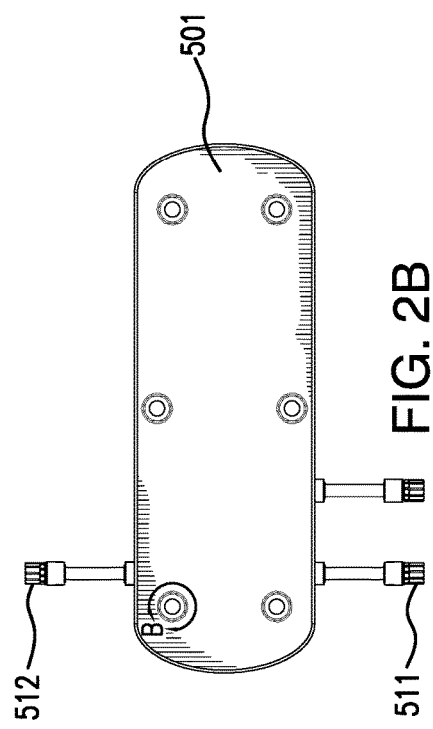

FLUID TREATMENT ASSEMBLY AND METHOD OF USE

BACKGROUND OF THE INVENTION

The use of tangential fluid flow (TFF) or single pass tangential fluid flow (SPTFF) technology typically includes placing fluid treatment assemblies (that include cassettes and gaskets) in stainless steel holders that provide sufficient compression and maintain seal integrity during operation.

However, there is a need for improved fluid treatment assemblies.

The present invention provides for ameliorating at least some of the disadvantages of the prior art. These and other advantages of the present invention will be apparent from the description as set forth below.

BRIEF SUMMARY OF THE INVENTION

An embodiment of the invention provides a fluid treatment assembly comprising one or more fluid treatment units, each fluid treatment unit including a permeable fluid treatment medium having a feed side and a permeate side; a feed inlet communicating with a fluid flow path extending from the feed inlet to the feed side of the permeable fluid treatment medium; a permeate outlet communicating with a permeate fluid flow path extending from the permeate side of the permeable fluid treatment medium to the permeate outlet; a retentate outlet communicating with a fluid flow path extending from the feed side of the permeable fluid treatment medium through the fluid treatment unit to the retentate outlet; first and second end plates, wherein each fluid treatment unit is positioned between the first and second end plates; and a plurality of adjustable tensioning rod assemblies extending between the first and second end plates and arranged to press the one or more fluid treatment units and the first and second end plates together, each adjustable tensioning rod assembly comprising a threaded tensioning rod extending between the first and second end plates, the tensioning rod having a first threaded end extending beyond the first end plate, and a tensioning nut and a locking nut threadably attached to the tensioning rod, the tensioning nut having a first external diameter and the locking nut having a second external diameter, wherein the first external diameter is greater than the second external diameter, the tensioning nut being rotatable on the threaded tensioning rod without rotating the locking nut.

In another embodiment, a method is provided for adjusting tension on a fluid treatment assembly, the fluid treatment assembly comprising one or more fluid treatment units, each fluid treatment element including a permeable fluid treatment medium having a feed side and a permeate side; a feed inlet communicating with a fluid flow path extending from the feed inlet to the feed side of the permeable fluid treatment medium; a permeate outlet communicating with a permeate fluid flow path extending from the permeate side of the permeable fluid treatment medium to the permeate outlet; a retentate outlet communicating with a fluid flow path extending from the feed side of the permeable fluid treatment medium through the fluid treatment unit to the retentate outlet; first and second end plates, wherein each fluid treatment unit is positioned between the first and second end plates; and a plurality of adjustable tensioning rod assemblies extending between the first and second end plates and arranged to press the one or more fluid treatment units and the first and second end plates together, each adjustable tensioning rod assembly comprising a threaded tensioning rod extending between the first and second end plates, the tensioning rod having a first threaded end extending beyond the first end plate, and a tensioning nut and a locking nut threadably attached to the tensioning rod, the tensioning nut having a first external diameter and the locking nut having a second external diameter, wherein the first external diameter is greater than the second external diameter, the tensioning nut being rotatable on the threaded tensioning rod without rotating the locking nut, the fluid treatment assembly having a desired preload applied thereto, and the locking nuts are in contact with the tensioning nuts, locking the tensioning nuts in place; the method comprising tightening the tensioning nuts to provide a desired operating tension to the fluid treatment assembly, without rotating the locking nuts.

In another embodiment, a method for adjusting tension and maintaining a preloaded condition on an embodiment of the fluid treatment assembly according to another embodiment of the invention is provided, the method comprising tightening the tensioning nuts to provide a desired preload to the fluid treatment assembly; tightening the locking nuts to contact the tightened tensioning nuts; and further tightening the tensioning nuts to provide a desired operating tension to the fluid treatment assembly, without further tightening the locking nuts.

BRIEF DESCRIPTION OF THE SEVERAL VIEWS OF THE DRAWING(S)

FIGS. 1A and 1B show isometric and top views of a fluid treatment assembly comprising a filtration module including a plurality of adjustable tensioning rod assemblies according to an embodiment of the present invention, the tensioning rod assemblies each comprising a tensioning rod having a first threaded end extending beyond an end plate, and a tensioning nut and a locking nut threadably attached to the tensioning rod, the tensioning nut located on the tensioning rod between the upper face of the end plate, and the locking nut.

FIG. 1C shows an exploded view of an illustrative fluid treatment unit in an illustrative fluid treatment assembly.

FIGS. 2A and 2B show isometric and top views of another illustrative fluid treatment assembly comprising a diafiltration module including a plurality of adjustable tensioning rod assemblies according to an embodiment of the present invention, the tensioning rod assemblies each comprising a tensioning rod having a first threaded end extending beyond an end plate, and a tensioning nut and a locking nut threadably attached to the tensioning rod, the tensioning nut located on the tensioning rod between the upper face of the end plate, and the locking nut.

FIG. 3 shows a perspective view of an end of an adjustable tensioning rod assembly according to the embodiment of the invention shown in FIG. 1A, the tensioning rod having a first threaded end extending beyond an end plate, and a tensioning nut and a locking nut threadably attached to the tensioning rod, the tensioning nut located on the tensioning rod between the upper face of the end plate, and the locking nut.

FIG. 4 shows a top view of the end of an adjustable tensioning rod assembly according to the embodiment in FIG. 3.

FIG. 5 shows a perspective view of an end of an adjustable tensioning rod assembly according to the embodiment of the invention shown in FIG. 2A, the tensioning rod having a first threaded end extending beyond an end plate, and a tensioning nut and a locking nut threadably attached to the tensioning rod, the tensioning nut located on the tensioning rod between the upper face of the end plate, and the locking nut.

FIG. 6 shows a top view of the end of an adjustable tensioning rod assembly according to the embodiment in FIG. 5.

DETAILED DESCRIPTION OF THE INVENTION

In accordance with an embodiment of the present invention, a fluid treatment assembly is provided comprising one or more fluid treatment units, each fluid treatment unit including a permeable fluid treatment medium having a feed side and a permeate side; a feed inlet communicating with a fluid flow path extending from the feed inlet to the feed side of the permeable fluid treatment medium; a permeate outlet communicating with a permeate fluid flow path extending from the permeate side of the permeable fluid treatment medium to the permeate outlet; a retentate outlet communicating with a fluid flow path extending from the feed side of the permeable fluid treatment medium through the fluid treatment unit to the retentate outlet; first and second end plates, wherein each fluid treatment unit is positioned between the first and second end plates; and a plurality of adjustable tensioning rod assemblies extending between the first and second end plates and arranged to press the one or more fluid treatment units and the first and second end plates together, each adjustable tensioning rod assembly comprising a threaded tensioning rod extending between the first and second end plates, the tensioning rod having a first threaded end extending beyond the first end plate, and a tensioning nut and a locking nut threadably attached to the tensioning rod, the tensioning nut having a first external diameter and the locking nut having a second external diameter, wherein the first external diameter is greater than the second external diameter, the tensioning nut being rotatable on the threaded tensioning rod without rotating the locking nut.

In another embodiment, a fluid treatment assembly comprises one or more fluid treatment units, each fluid treatment unit including a permeable fluid treatment medium having a feed side and a permeate side; a feed inlet and a feed passage extending from the feed inlet through the fluid treatment unit to the feed side of the permeable fluid treatment medium; a permeate outlet and a permeate passage extending from the permeate side of the permeable fluid treatment medium to the permeate outlet; a retentate outlet and a retentate passage extending from the feed side of the permeable fluid treatment medium through the fluid treatment unit to the retentate outlet; first and second end plates, wherein each fluid treatment unit is positioned between the first and second end plates; and a plurality of adjustable tensioning rod assemblies extending between the first and second end plates and arranged to press the one or more fluid treatment units and the first and second end plates together, each adjustable tensioning rod assembly comprising a threaded tensioning rod extending between the first and second end plates, the tensioning rod having a first threaded end extending beyond the first end plate, and a tensioning nut and a locking nut threadably attached to the tensioning rod, the tensioning nut having a first external diameter and the locking nut having a second external diameter, wherein the first external diameter is greater than the second external diameter, the tensioning nut being rotatable on the threaded tensioning rod without rotating the locking nut.

In some embodiments, the fluid treatment assemblies further comprise first and second manifold plates, wherein the first manifold plate is positioned between the first end plate and the one or more fluid treatment units, and the second manifold plate is positioned between the second end plate and the one or more fluid treatment elements, and the plurality of adjustable tensioning rod assemblies are arranged to press the one or more fluid treatment units, the first and second manifold plates, and the first and second end plates, together.

Typically, each adjustable tensioning rod assembly further comprises a washer located between the bottom face of the tensioning nut and the upper face of the first end plate.

A method for adjusting tension and maintaining a preloaded condition on an embodiment of the fluid treatment assembly according to another embodiment of the invention is provided, the method comprising tightening the tensioning nuts to provide a desired preload to the fluid treatment assembly; tightening the locking nuts to contact the tightened tensioning nuts; and further tightening the tensioning nuts to provide a desired operating tension to the fluid treatment assembly, without further tightening the locking nuts.

A method for adjusting tension on an embodiment of the fluid treatment assembly according to another embodiment of the invention is provided, wherein the fluid treatment assembly has a desired preload applied thereto, the method comprising tightening the tensioning nuts to provide a desired operating tension to the fluid treatment assembly, without further tightening the locking nuts.

In another embodiment, a method is provided for adjusting tension on a fluid treatment assembly, the fluid treatment assembly comprising one or more fluid treatment units, each fluid treatment element including a permeable fluid treatment medium having a feed side and a permeate side; a feed inlet communicating with a fluid flow path extending from the feed inlet to the feed side of the permeable fluid treatment medium; a permeate outlet communicating with a permeate fluid flow path extending from the permeate side of the permeable fluid treatment medium to the permeate outlet; a retentate outlet communicating with a fluid flow path extending from the feed side of the permeable fluid treatment medium through the fluid treatment unit to the retentate outlet; first and second end plates, wherein each fluid treatment unit is positioned between the first and second end plates; and a plurality of adjustable tensioning rod assemblies extending between the first and second end plates and arranged to press the one or more fluid treatment units and the first and second end plates together, each adjustable tensioning rod assembly comprising a threaded tensioning rod extending between the first and second end plates, the tensioning rod having a first threaded end extending beyond the first end plate, and a tensioning nut and a locking nut threadably attached to the tensioning rod, the tensioning nut having a first external diameter and the locking nut having a second external diameter, wherein the first external diameter is greater than the second external diameter, the tensioning nut being rotatable on the threaded tensioning rod without rotating the locking nut, the fluid treatment assembly having a desired preload applied thereto, and the locking nuts are in contact with the tensioning nuts, locking the tensioning nuts in place; the method comprising tightening the tensioning nuts to provide a desired operating tension to the fluid treatment assembly, without rotating the locking nuts.

In another embodiment a method is provided for adjusting tension and maintaining a preloaded condition on a fluid treatment assembly, the fluid treatment assembly comprising one or more fluid treatment units, each fluid treatment unit including a permeable fluid treatment medium having a feed side and a permeate side; a feed inlet and a feed passage extending from the feed inlet through the fluid treatment unit to the feed side of the permeable fluid treatment medium; a permeate outlet and a permeate passage extending from the permeate side of the permeable fluid treatment medium to the permeate outlet; a retentate outlet and a retentate passage extending from the feed side of the permeable fluid treatment medium through the fluid treatment unit to the retentate outlet; first and second end plates, wherein each fluid treatment unit is positioned between the first and second end plates; and a plurality of adjustable tensioning rod assemblies extending between the first and second end plates and arranged to press the one or more fluid treatment units and the first and second end plates together, each adjustable tensioning rod assembly comprising a threaded tensioning rod extending between the first and second end plates, the tensioning rod having a first threaded end extending beyond the first end plate, and a tensioning nut and a locking nut threadably attached to the tensioning rod, the tensioning nut having a first external diameter and the locking nut having a second external diameter, wherein the first external diameter is greater than the second external diameter, the first external diameter allowing the tensioning nut to be rotated on the threaded tensioning rod without rotating the locking nut; the method comprising: tightening the tensioning nuts to provide a first desired preload to the fluid treatment assembly; tightening the locking nuts to contact the tightened tensioning nuts; and, further tightening the tensioning nuts to provide a desired operating tension to the fluid treatment assembly, without further tightening the locking nuts.

Some embodiments of the method further comprise relieving the desired operating tension and approaching, or returning to, the desired preload, including loosening the tightened tensioning nuts. For example, an embodiment of the method further comprises relieving the desired operating tension and returning to the desired preload, including loosening the tightened tensioning nuts until they contact the locking nuts Advantageously, overcompression of the fluid treatment assembly can be minimized or avoided, and the assembly can be adjusted to provide a desirable operating tension (operating load), and, if desired, to provide at least one lower preloaded tension that maintains the alignment and sealing integrity of the assembly without overcompressing the assembly. Fluid treatment assemblies can be utilized as stand-alone units without requiring an additional stainless steel holder.

Embodiments of the invention allow providing a preload before providing an operations load. For example, a preload of about 800 lbs can be provided, followed by an operations load of about 1,200 lbs to about 3,000 lbs. In another example, a preload of about 3,500 lbs can be provided, followed by an operations load of about 5,000 lbs to about 14,000 lbs.

Since the locking nut has a smaller external diameter than that of the tensioning nut, a desired torque can be applied to the tensioning nut without turning or changing the position of the locking nut. Illustratively, a socket (for use with the specific size of the tensioning nut) can be fit over the end of the tensioning rod, such that it will contact the walls of the tensioning nut without contacting the walls of the locking nut. A torque wrench can be engaged with the socket, allowing the desired torque to be applied to the tensioning nut to provide the desired operating tension. Since the locking nut remains in position (at the desired preloaded tension position), the tensioning nut can be subsequently loosened (using a wrench or socket) until it approaches, and in some embodiments, contacts, the locking nut, such that the fluid treatment assembly approaches, and if desired, is returned to, the desired preloaded condition (tension), wherein unnecessary stresses on the fluid treatment assembly are relieved while the assembly is not in use.

A variety of nut sizes can be used in accordance with embodiments of the invention, and can be selected by one of skill in the art. As noted above, the differences in external diameter between that of the locking nut and that of the tensioning nut allows the tensioning nut to be accessed and turned (e.g., to adjust the operating tension and to return to a desired preload tension) without turning the locking nut. Typically, if U.S. sizes are used, the tensioning nut has an external diameter (the diameter across the flats of the nut, which is also the size wrench or socket to use) that is at least 1/16" larger than the external diameter of the locking nut. For example, if the external diameter of the locking nut is 7/16", the external diameter of the tensioning nut is typically at least 8/16" (1/2"). Similarly, if metric sizes are used, the tensioning nut has an external diameter that is typically at least 1 mm larger than the external diameter of the locking nut.

Illustratively, in one embodiment, the locking nut has an external diameter of 1/2 in. and the tensioning nut has an external diameter of 9/16 in. However, both nuts include the same internal thread pitch and inner diameter.

While the nuts can be turned on the threads of the tensioning rod such that the lower face of the locking nut contacts the upper face of the tensioning nut, the nuts do not include structures or elements allowing the nuts to be joined together independently of turning them on the threads of the tensioning rod to contact one another. For example, the nuts include internal threads allowing them to be turned on the threads of the tensioning rod, but they do not include additional threads allowing one nut to be threaded into the threads of the other nut.

Preferably, the tensioning nuts (or at least the threads of the tensioning nuts) are made of a different material and/or grade than that of the tensioning rods (or at least the threads of the tensioning rods). For example, in an embodiment, the tension nuts are silicon bronze, and the tensioning rods are stainless steel (SS), e.g., 316 SS or Alloy 20 SS. A variety of materials and grades are suitable. Other suitable materials include, for example, titanium. Typically, the locking nuts, and washers (if present) are made of the same material as the tensioning rods.

The locking nut (or the portion of the threads on the tensioning rod in the location where the locking nut is expected to remain) can include a thread locking fluid that can be applied to the threads (e.g., an adhesive applied to the threads, for example, an adhesive fluid available under the brand LOCTITE®), or the nut can include a structure that resists loosening such as an insert, e.g., a plastic deformable material. Alternatively, while less desirable, the locking nut can be locked in position with, for example, an additional nut on top of the locking nut.

Embodiments of the invention are suitable for use with a wide variety of fluid treatment assemblies and processes (e.g., filtration and diafiltration, for example, ultrafiltration) utilizing the assemblies, especially including TFF and SPTFF filter assemblies and processes. Suitable assemblies include those disclosed in, for example, U.S. Pat. Nos. 4,715,955, 4,849,102, and 7,918,999; U.S. Patent Application Publications 2008/0135468, 2008/0135499, 2013/0037486, and 2013/0118971; and U.S. patent application Ser. No. 15/015,350 filed Feb. 4, 2016; as well as those commercially available under the trademarks CENTRAMATE™ and CENTRASETTE™ (Pall Corporation, Port Washington, N.Y.).

Each of the components of the invention will now be described in more detail below, wherein like components have like reference numbers.

FIGS. 1 and 2 each show an illustrative fluid treatment assembly 500 comprising a top (first) end plate 501, a bottom (second) end plate 502, a top (first) manifold plate 510 (e.g., a retentate/permeate top manifold plate), a bottom (second) manifold plate 520 (e.g., a feed bottom manifold plate), wherein the bottom and top manifold plates include one or more ports, illustrated as a feed inlet 521, a retentate outlet 511, and a permeate outlet 512. In the illustrated embodiments, the bottom manifold plate 520 comprises the feed inlet 521 (for introducing feed solution into the filter assembly), and the top manifold plate comprises the retentate outlet 511 and the permeate outlet 512. Alternatively, or additionally, bottom manifold plate 520 can have the, or an additional, permeate outlet (not shown). At least one at least one fluid treatment unit 530 (such as a fluid treatment module) including a permeable fluid treatment medium (preferably, a porous membrane such as an ultrafiltration (UF) membrane) having a feed side and a permeate side, is positioned between the first and second end plates. The embodiment illustrated in FIG. 2 has a plurality of fluid treatment units 530 (530a, 530b, 530c, 530d, 530e, 530f) positioned between the first and second end plates.

If desired, one or more fluid treatment units can include one or more subassemblies such as cross fluid treatment subassemblies, each including one membrane such as a UF membrane. A variety of arrangements for cross fluid treatment subassemblies comprising membranes between feed/retentate sides (feed channels/retentate channels) and permeate sides (permeate channels) are suitable for use in the invention. Typically, the feed/retentate channels and permeate channels include spacer materials and/or perforate materials such as screens or meshes. The screens or meshes can have any suitable size openings, e.g., fine, medium, or coarse size openings. A cross fluid treatment subassembly can have any number of membranes, feed channels/retentate channels, and permeate channels, including, for example, those disclosed in U.S. Pat. No. 8,980,088.

FIG. 1C shows an exploded view of an illustrative cross fluid treatment subassembly 531, including membranes 531a, 531b interposed between feed/retentate channels 532a, 532b and permeate channels 533a, 533b, also showing the feed, retentate, and permeate passages and respective fluid flow paths (wherein the additional layers of filtration components represent additional permeate channels, membrane layers, and feed/retentate channels). In contrast with FIG. 1A, wherein, with a retentate port at the top, flow would come out of the top, in FIG. 1C, the ports are at the bottom, and flow comes out of the bottom.

The fluid treatment assembly and/or one or more fluid treatment units can include additional elements such as, for example, one or more gaskets. Typically, gaskets are additionally present between fluid treatment units, and between a fluid treatment unit and a manifold plate.

In these embodiments illustrated in FIGS. 1 and 2, the single fluid treatment unit (FIG. 1) and the collective plurality of fluid treatment units (FIG. 2) are positioned between the first and second manifold plates, which are positioned between the first and second end plates. Thus, the one or more fluid treatment units and the first and second end plates are pressed together, and in those embodiments including first and second manifold plates, the one or more fluid treatment units, the first and second manifold plates, and the first and second end plates, and gaskets between the manifold plates and the fluid treatment units (and between fluid treatment units), are pressed together The illustrative fluid treatment assembly 500 shown in FIG. 2 is a diafiltration fluid treatment assembly, also including a diafiltration distribution plate 570 (570a, 570b, 570c, 570d, 570e, 570f) comprising a diafiltration fluid feed inlet 571 (571a, 571b, 571c, 571d, 571e). While not shown, each diafiltration distribution plate includes a diafiltration fluid feed channel in fluid communication with the diafiltration fluid feed inlet 571 and a common feed/retentate port, and at least one common feed permeate/diafiltration fluid permeate outlet port (see, for example, U.S. patent application Ser. No. 15/015,350).

The first and second end plates, the top and bottom manifold plates (if present), and the diafiltration distribution plates (if present), include holes allowing the threaded tensioning rods of the adjustable tensioning rod assemblies to pass therethrough such that the plates with the one or more fluid treatment units therebetween, can be stacked, to assemble the fluid treatment assemblies.

As shown in the figures, each fluid treatment assembly 500 includes a plurality of adjustable tensioning rod assemblies 100 extending between the first and second end plates 501, 502 and arranged to press the one or more fluid treatment unit 530 and the first and second end plates together (in those embodiments including first and second manifold plates 510 and 520, the assemblies 100 are arranged to pass the one or more fluid treatment units, the first and second manifold plates, and the first and second end plates, together), each adjustable tensioning rod assembly 100 comprising a threaded tensioning rod 101 (which can comprise a bolt) extending between the first and second end plates, the tensioning rod having a first threaded end 101a extending beyond the first end plate, and a tensioning nut 110 and a locking nut 120 threadably attached to the tensioning rod, the tensioning nut having a first external diameter and the locking nut having a second external diameter, wherein the first external diameter is greater than the second external diameter, the tensioning nut being rotatable on the threaded tensioning rod without rotating the locking nut.

FIGS. 3-6 show embodiments of the adjustable tensioning rod assemblies 100 in more detail, wherein the lower faces 120b of the locking nuts 120 are directed toward, and can contact, the upper faces 110a of the tensioning nuts 110. While the lower faces 110b of the tensioning nuts 110 are directed toward, and can contact, the upper face 501a of the first end plate 501, preferred embodiments of the adjustable tensioning rod assemblies 100 further comprise washers 130 interposed between the lower faces 110b of the tensioning nuts 110 and the upper face 501 of the first end plate 501, such that the opposing faces of the washers contact the lower faces 110b of the tensioning nuts 110 and the upper face 501 of the first end plate 501 respectively, when the tensioning nuts are torqued to the operating tension, e.g., to functionalize the fluid treatment assemblies.

The following examples further illustrate the invention but, of course, should not be construed as in any way limiting its scope.

Example

This example demonstrates fluid treatment assemblies and adjusting tension and maintaining a preloaded condition and operating tension on the fluid treatment assemblies in accordance with embodiments of the invention.

The threads of the tensioning rods (bolts), tensioning nuts, and locking nuts are 5/16" 18 thread. The tensioning nuts are silicon bronze, and the rods, locking nuts, and washers are 316 SS. The tensioning nuts are 19/64" wide, the locking nuts are 17/64" wide. The locking nuts include nylon inserts.

Fluid treatment assemblies as generally shown in FIGS. 1 and 2 are assembled.

The tensioning nuts are hand tightened.

The assemblies (93 $cm^2$ and 186 $cm^2$ formats, and 0.1 $m^2$ formats) are each placed in a pneumatic compression press. The press is activated to compress the assembly stacks to uniform loads.

The 93 $cm^2$ and 186 $cm^2$ formats are compressed to a pressure of about 30 psi, and the 0.1 $m^2$ formats are compressed to a pressure of about 55 psi.

After about 15-30 minutes of pressure hold, the tensioning nuts are locked in place to a specified torque value, for the 93 $cm^2$ and 186 $cm^2$ formats, the torque is 18 in-lb (providing a preload of about 1000 lbs); and the torque is 25 in-lb for the 0.1 $m^2$ cassette formats (providing a preload of about 1800 lbs).

The pressure in the pneumatic compression press is released (after about 15 minutes for the 93 $cm^2$ and 186 $cm^2$ formats, and after about 30 minutes for the 0.1 $m^2$ cassette formats), and the assemblies are removed from the press.

The assemblies are tested to ensure that the seals are integral, and subsequently preserved in storage solution.

The locking nuts are tightened to contact the tensioning nuts to lock the tensioning nuts in place.

In preparation for operation, the operator uses a torque wrench connected to a suitable deep socket to access the tensioning nuts from the top of the cassette modules and tighten the nuts to the desired torque for operation (e.g., about 20 to about 50 in-lbs for 93 $cm^2$ and 186 $cm^2$ module formats (providing an operations load of about 1800 lbs), and about 50 to about 70 in-lbs for 0.1 $m^2$ cassette formats (providing an operations load of about 2300 lbs).

Once processing (e.g., filtration, such as ultrafiltration) is complete, and post processing steps (if desired, e.g., collecting the desired filtration product and cleaning) are performed, the tensioning nuts are backed off using a wrench until the tensioning nuts approach or contact the lock nuts. This relieves stress, and the cassettes are stored with a reduced tension (e.g., with the desired preload) until used again (wherein the tensioning nuts are torqued to the desired operating tension).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fluid treatment assembly comprising:
one or more fluid treatment units, each fluid treatment unit including a permeable fluid treatment medium having a feed side and a permeate side;
a feed inlet communicating with a fluid flow path extending from the feed inlet to the feed side of the permeable fluid treatment medium;
a permeate outlet communicating with a permeate fluid flow path extending from the permeate side of the permeable fluid treatment medium to the permeate outlet;
a retentate outlet communicating with a fluid flow path extending from the feed side of the permeable fluid treatment medium through the fluid treatment unit to the retentate outlet;
first and second end plates, wherein each fluid treatment unit is positioned between the first and second end plates and wherein the first end plate includes an upper face; and
a plurality of adjustable tensioning rod assemblies extending between the first and second end plates and arranged to press the one or more fluid treatment units and the first and second end plates together, each adjustable tensioning rod assembly comprising a threaded tensioning rod extending between the first and second end plates, the tensioning rod having a first threaded end extending beyond the first end plate, and a tensioning nut and a locking nut threadably attached to the first threaded end of the tensioning rod, the tensioning nut having a tensioning nut upper face, a tensioning nut lower face, and a first external diameter and the locking nut having a locking nut lower face, and a second external diameter, wherein the first external diameter is greater than the second external diameter, and wherein the locking nut lower face is directed toward the tensioning nut upper face, and the tensioning nut lower face is directed toward the upper face of the first end plate; the tensioning nut being rotatable on the threaded tensioning rod without rotating the locking nut.

2. A method for adjusting tension on a fluid treatment assembly, the fluid treatment assembly comprising:
one or more fluid treatment units, each fluid treatment unit including a permeable fluid treatment medium having a feed side and a permeate side;
a feed inlet communicating with a fluid flow path extending from the feed inlet to the feed side of the permeable fluid treatment medium;
a permeate outlet communicating with a permeate fluid flow path extending from the permeate side of the permeable fluid treatment medium to the permeate outlet;
a retentate outlet communicating with a fluid flow path extending from the feed side of the permeable fluid treatment medium through the fluid treatment unit to the retentate outlet;
first and second end plates, wherein each fluid treatment unit is positioned between the first and second end plates and wherein the first end plate includes an upper face; and
a plurality of adjustable tensioning rod assemblies extending between the first and second end plates and arranged to press the one or more fluid treatment units and the first and second end plates together, each adjustable tensioning rod assembly comprising a threaded tensioning rod extending between the first and second end plates, the tensioning rod having a first threaded end extending beyond the first end plate, and a tensioning nut and a locking nut threadably attached to the first threaded end of the tensioning rod, the tensioning nut having a tensioning nut upper face, a tensioning nut lower face, and a first external diameter and the locking nut having a locking nut lower face, and a second external diameter, wherein the first external diameter is greater than the second external diameter, and wherein the locking nut lower face is directed toward the tensioning nut upper face, and the tensioning nut lower face is directed toward the upper face of the first end plate; the tensioning nut being rotatable on the threaded tensioning rod without rotating the locking nut, the fluid treatment assembly having a desired preload applied thereto, and the locking nuts are in contact with the tensioning nuts, locking the tensioning nuts in place;
the method comprising tightening the tensioning nuts to provide a desired operating tension to the fluid treatment assembly, without rotating the locking nuts.

3. A method for adjusting tension and maintaining a preloaded condition on a fluid treatment assembly, the fluid treatment assembly comprising:
one or more fluid treatment units, each fluid treatment unit including a permeable fluid treatment medium having a feed side and a permeate side;
a feed inlet communicating with a fluid flow path extending from the feed inlet to the feed side of the permeable fluid treatment medium;
a permeate outlet communicating with a permeate fluid flow path extending from the permeate side of the permeable fluid treatment medium to the permeate outlet;
a retentate outlet communicating with a fluid flow path extending from the feed side of the permeable fluid treatment medium through the fluid treatment unit to the retentate outlet;
first and second end plates, wherein each fluid treatment unit is positioned between the first and second end plates and wherein the first end plate includes an upper face; and
a plurality of adjustable tensioning rod assemblies extending between the first and second end plates and arranged to press the one or more fluid treatment units and the first and second end plates together, each adjustable tensioning rod assembly comprising a threaded tensioning rod extending between the first and second end plates, the tensioning rod having a first threaded end extending beyond the first end plate, and a tensioning nut and a locking nut threadably attached to the first threaded end of the tensioning rod, the tensioning nut having a tensioning nut upper face, a tensioning nut lower face, and a first external diameter and the locking nut having a locking nut lower face, and a second external diameter, wherein the first external diameter is greater than the second external diameter, and wherein the locking nut lower face is directed toward the tensioning nut upper face, and the tensioning nut lower face is directed toward the upper face of the first end plate; the tensioning nut being rotatable on the threaded tensioning rod without rotating the locking nut;
the method comprising:
a) tightening the tensioning nuts to provide a desired preload to the fluid treatment assembly;
b) tightening the locking nuts to contact the tightened tensioning nuts; and,
c) further tightening the tensioning nuts to provide a desired operating tension to the fluid treatment assembly, without further tightening the locking nuts.

4. The method of claim 2, further comprising relieving the desired operating tension and approaching, or returning to, the desired preload, including loosening the tightened tensioning nuts.

5. The method of claim 2, further comprising relieving the desired operating tension and returning to the desired preload, including loosening the tightened tensioning nuts until they contact the locking nuts.

6. The assembly of claim 1, wherein the locking nut includes a thread sealer.

7. The assembly of claim 1, wherein each tensioning rod assembly further comprises a washer interposed between the tensioning nut and an upper face of the first end plate.

8. The assembly of claim 1, wherein the tensioning nuts are made of a different material than the tensioning rods.

9. The assembly of claim 1, further comprising first and second manifold plates, wherein the first manifold plate is positioned between the first end plate and the one or more fluid treatment units, and the second manifold plate is positioned between the second end plate and the one or more fluid treatment elements, and the plurality of adjustable tensioning rod assemblies are arranged to press the one or more fluid treatment units, the first and second manifold plates, and the first and second end plates, together.

10. The method of claim 3, further comprising relieving the desired operating tension and approaching, or returning to, the desired preload, including loosening the tightened tensioning nuts.

11. The assembly of claim 6, wherein each tensioning rod assembly further comprises a washer interposed between the tensioning nut and an upper face of the first end plate.

12. The assembly of claim 6, wherein the tensioning nuts are made of a different material than the tensioning rods.

13. The assembly of claim 7, wherein the tensioning nuts are made of a different material than the tensioning rods.

14. The assembly of claim 6, further comprising first and second manifold plates, wherein the first manifold plate is positioned between the first end plate and the one or more fluid treatment units, and the second manifold plate is positioned between the second end plate and the one or more fluid treatment elements, and the plurality of adjustable tensioning rod assemblies are arranged to press the one or more fluid treatment units, the first and second manifold plates, and the first and second end plates, together.

15. The assembly of claim 7, further comprising first and second manifold plates, wherein the first manifold plate is positioned between the first end plate and the one or more fluid treatment units, and the second manifold plate is positioned between the second end plate and the one or more fluid treatment elements, and the plurality of adjustable tensioning rod assemblies are arranged to press the one or more fluid treatment units, the first and second manifold plates, and the first and second end plates, together.

16. The assembly of claim 8, further comprising first and second manifold plates, wherein the first manifold plate is positioned between the first end plate and the one or more fluid treatment units, and the second manifold plate is positioned between the second end plate and the one or more fluid treatment elements, and the plurality of adjustable tensioning rod assemblies are arranged to press the one or more fluid treatment units, the first and second manifold plates, and the first and second end plates, together.

17. The assembly of claim 11, further comprising first and second manifold plates, wherein the first manifold plate is positioned between the first end plate and the one or more fluid treatment units, and the second manifold plate is positioned between the second end plate and the one or more fluid treatment elements, and the plurality of adjustable tensioning rod assemblies are arranged to press the one or more fluid treatment units, the first and second manifold plates, and the first and second end plates, together.

18. The assembly of claim 12, further comprising first and second manifold plates, wherein the first manifold plate is positioned between the first end plate and the one or more fluid treatment units, and the second manifold plate is positioned between the second end plate and the one or more fluid treatment elements, and the plurality of adjustable tensioning rod assemblies are arranged to press the one or more fluid treatment units, the first and second manifold plates, and the first and second end plates, together.

19. The assembly of claim 13, further comprising first and second manifold plates, wherein the first manifold plate is positioned between the first end plate and the one or more fluid treatment units, and the second manifold plate is positioned between the second end plate and the one or more fluid treatment elements, and the plurality of adjustable tensioning rod assemblies are arranged to press the one or more fluid treatment units, the first and second manifold plates, and the first and second end plates, together.

* * * * *